3,317,532
DERIVATIVES OF PYRIMIDINE
Alden Gamaliel Beaman, North Caldwell, and Robert Duschinsky, Essex Fells, N.J., assignors to Hoffmann-La Roche Inc., Nutley, N.J., a corporation of New Jersey
No Drawing. Filed Nov. 19, 1964, Ser. No. 412,338
6 Claims. (Cl. 260—251)

This invention relates to a novel chemical process and to novel chemical compounds which are useful as intermediates in said process. More particularly, the invention relates to a novel process for the preparation of 5-fluoro-2(1H)pyrimidinone and to novel chemical intermediates for the preparation thereof. The 5-fluoro-2(1H)pyrimidinone end-product of this invention is a known substance and is not herein claimed as novel. The end-product is disclosed, for example, in Biochem. J., vol. 92, No. 1, pp. 27–28 (1964). It is disclosed therein as being useful in the preparation of 5-fluoropyrimidin-2-one deoxyriboside which is useful in inhibiting the growth of microorganism, i.e., inhibition of E. coli K–12.

Heretofore, the end-product of this invention, i.e., the 5-fluoro-2(1H)pyrimidinone has been prepared by the method disclosed in Biochem., Biophys. Acta, vol. 87, pp. 353–355 (1964). The prior art synthesis of 5-fluoro-2(1H)pyrimidinone utilizes the treatment of 5-fluorouracil with sodium amalgam. The reaction and subsequent recovery steps involve the use of costly reagents and cumbersome techniques giving only poor yields of the end-product. In contrast thereto, the process of the instant invention provides a relatively simple and inexpensive process for preparing high yields of 5-fluoro-2(1H)pyrimidinone in a particularly facile manner which is readily adaptable to large scale production. Broadly stated the process of this invention comprises reduction of 2-alkoxy-5-fluorouracil by successive thiation and dethiation and thereafter hydroysis to obtain the desired 5-fluoro-2(1H)pyrimidinone.

In one comprehensive embodiment the invention provides a process which comprises thiation of a 2-alkoxy-5-fluorouracil to form a 2-alkoxy-5-fluoro-4-thiopyrimidine, dethiation of said thiopyrimidine to form a 2-alkoxy-5-fluoropyrimidine and hydrolysis of the 2-alkoxy-5-fluoropyrimidine to form 5-fluoro2(1H)pyrimidinone. The overall process of this invention can be represented by the following flow sheet

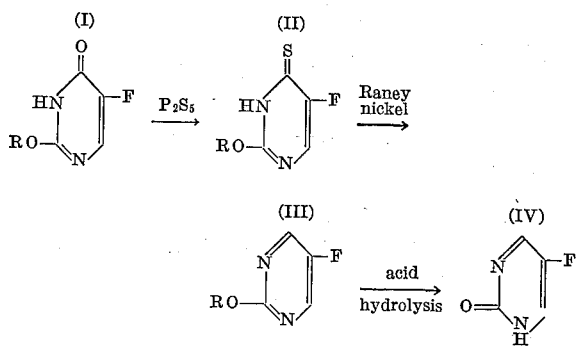

wherein the symbol R represents lower alkyl.

The compounds of Formulas II and III which, as stated above, are useful in the prepartion of 5-fluoro-2(1H) pyrimidinone, are novel compounds and thus constitute a part of this invention. The 2-alkoxy-5-fluorouracil employed as starting materials in the process of this invention is a known class of compounds prepared by known methods. These compounds and the method for their preparation are disclosed, for example, in U.S. Pat. No. 2,802,005.

According to the process of this invention, a 2-alkoxy-5-fluorouracil having the Formula I is subjected to thiation with phosphorus pentasulfide in an organic solvent. Any suitable organic solvent which is inert under the reaction conditions employed may be used. Suitable solvents for use in the thiation reaction are, for example, pyridine, β-picoline, 2 - methyl - 6 - ethyl - pyridine and tetrahydronaphthalene. The reaction can be carried out over a wide range of temperatures; however, it is preferred to conduct the reaction at an elevated temperature. A preferred temperature range is between about room temperature and the reflux temperature of the reaction mixture. The reaction is preferably carried out under substantially anhydrous conditions. Upon completion of the reaction, the reaction mixture is cooled to precipitate the 2-alkoxy-5-fluoro-4-thiopyrimidine which can be recovered by ordinary techniques such as filtration. The 2-alkoxy-5-fluoro-4-thiopyrimidine is converted to the sulfur-free 2-alkoxy-5-fluoropyrimidine by heating in a suitable solvent, such as water, alcohol and the like, with a nickel catalyst such as Raney nickel. The dethiation is conveniently carried out by mixing a suspension of Raney nickel in ethanol with the appropriate 2-alkoxy-5-fluoro-4-thiopyrimidine and stirring the mixture at room temperature though temperatures above or below room temperature can also be used. The nickel catalyst is filtered off and the 2-alkoxy-5-fluoropyrimidine product recovered by ordinary techniques such as by distillation.

The 2-alkoxy-5-fluoropyrimidine can be converted to the desired 5-fluoro-2(1H)pyrimidinone end-product by acid hydrolysis. The hydrolysis can be conveniently effected by conventional means, for example, by heating with an aqueous solution of a mineral acid such as hydrochloric acid, sulfuric acid and the like. While any suitable acid can be used in the hydrolysis step, it is preferred to use a mixture of glacial acetic acid and hydrochloric acid.

It will be appreciated that the compounds represented by Formula II in the flow sheet herein and referred to in this specification as 2-alkoxy-5-fluoro-4-thiopyrimidines can exist in tautomeric forms resulting from the shifting of a proton between a nitrogen atom and a sulfur atom. The invention includes all of the tautomeric forms of the said compound.

The invention is further disclosed in the following examples which are illustrative but not limitative thereof. All temperatures are in degrees centigrade and all melting points have been corrected.

EXAMPLE 1

Preparation of 2-ethoxy-5-fluoro-4-thiopyrimidine

Two liters of reagent pyridine was stirred at room temperature and 275 g. of a reactive grade of phosphorus pentasulfide manufactured by the Monsanto Company of St. Louis, Mo., was added followed by 300 g. of recrystallized 2-ethoxy-5-fluorouracil, M.P. 179–180.5°. With stirring the mixture was heated to reflux and then refluxed for 15 minutes. Excess pyridine (1.8 l.) was removed at water aspirator vacuum (approximately 20 mm.), and to the resulting syrup 2 l. of cold water was added rapidly with stirring. The slurry was stirred for 1 hour and the purple solid collected, washed with cold water and dried. The crude material was purified by crystallization from 3 parts of boiling toluene followed by crystallization from 15 parts of boiling water using 10 percent by weight of charcoal (drying the powdered crystals in a thin layer for 3.5 hours at 80–90° at 2 mm. to remove about 28–30 g. of pyridine), and a final crystallization from 2 parts of boiling ethanol (cooling in Dry Ice) to give pale yellow fine dense crystals of 2-ethoxy-5-fluoro-4-thiopyrimidine, M.P. 134–135°.

EXAMPLE 2

*Preparation of 5-fluoro-2-methoxy-4-thiopyrimidine*

To 1100 ml. of reagent pyridine in a 3 l. flask was added with stirring 167 g. of a reactive grade of phosphorus pentasulfide manufactured by the Monsanto Company of St. Louis, Mo., followed by 167 g. of pure, colorless, crystalline 2-methoxy-5-fluorouracil. The mixture was heated to reflux, and refluxed with stirring for 10 minutes. Then, without delay, the excess pyridine (800–900 ml.) was removed at water aspirator vacuum (about 20 mm.), and to the remaining syrup which had cooled to room temperature was added rapidly with efficient stirring 1100 ml. of water at 5°. The mixture was stirred vigorously for 1½ hours, and then the slurry was evaporated to slightly less than ½ its original volume at water aspirator vacuum. The solid which formed was collected, washed with a little water and dried. This was boiled with 2 l. of toluene and filtered. From the toluene was crystallized 5-fluoro-2-methoxy-4-thiopyrimidine. This was recrystallized from 15 parts of boiling water using charcoal to give light yellow needles of 5-fluoro-2-methoxy-4-thiopyrimidine, M.P. 156–158°.

EXAMPLE 3

*2-ethoxy-5-fluoropyrimidine*

Water wet Raney nickel (780 g.) was washed with 4 times 250 ml. of absolute ethanol and suspended in 1000 ml. of absolute ethanol. This suspension was stirred vigorously at room temperature and to it was added slowly a solution of 50 g. of the 2-ethoxy-5-fluoro-4-thiopyrimidine, produced as described in Example 1, in absolute ethanol. The resulting slurry was stirred for 30 minutes at room temperature and the catalyst filtered on a Büchner. (The filter flask into which the filtrate ran under vacuum was cooled in a Dry Ice bath to prevent loss of the volatile product.) The nickel was washed with 500 ml. of absolute ethanol. The bulk of the ethanol was distilled from the filtrate plus wash using a 35 cm. Vigreux column at atmospheric pressure. The residual 75 ml. of liquid was transferred to a smaller apparatus and ethanol distilled off. The residue was distilled (7 cm. Vigreux column, atmospheric pressure) to give the 2-ethoxy-5-fluoropyrimidine product as a colorless liquid, B.P. 181–182°.

EXAMPLE 4

*5-fluoro-2-methoxypyrimidine*

Water wet Raney nickel (92 g.) was washed with three times 100 ml. of absolute ethanol and suspended in 100 ml. of absolute ethanol. The suspension was stirred vigorously at room temperature, and to it was added a solution of 6.0 g. of the 5-fluoro-2-methoxy-4-thiopyrimidine product prepared as in Example 2 in 100 ml. of absolute ethanol. The mixture was stirred for 30 minutes at room temperature, and the nickel was filtered and washed with 4 times 50 ml. of absolute ethanol. The excess ethanol was distilled at atmospheric pressure using a 30 cm. Vigreux column. The remaining 25 ml. of liquid was transferred to a small still and distilled at atmospheric pressure (7 cm. Vigreux column) to remove ethanol. The residue was distilled to give the 5-fluoro-2-methoxypyrimidine product as a colorless liquid, B.P. 163–164°.

EXAMPLE 5

*5-fluoro-2(1H)-pyrimidinone from 2-ethoxy-5-fluoropyrimidine*

5-fluoro-2-methoxypyrimidine (131 mg.) was dissolved in a mixture of 9 ml. of glacial acetic acid plus 1 ml. of 2 N hydrochloric acid and the solution refluxed for 1 hour. The solutions from several small runs were combined and freeze dried and the residue dissolved in 10 ml. of distilled water plus 7 ml. of 1 N NaOH and the solution fractionated on a Dowex 1–X4 (acetate) column. The main fraction was freeze dried and crystallized from benzene to give colorless needles of 5-fluoro-2(1H)-pyrimidinone, M.P. 170–171.5°.

EXAMPLE 6

*5-fluoro-2(1H)-pyrimidinone from 2-ethoxy-5-fluoropyrimidine*

2-ethoxy-5-fluoropyrimidine (4.87 g.) was refluxed with a mixture of 360 ml. of glacial acetic acid plus 40 ml. of 2 N hydrochloric acid with stirring to avoid bumping until the reaction appeared to be complete as indicated by U.V. absorption in 0.1 N HCl. This required 4.5 hours. The rather dark solution was cooled and freeze dried and the residue dissolved in 100 ml. of distilled water plus enough 1 N NaOH to bring the pH to 11.7. This solution was fractionated on a Dowex 1–X4 acetate column 2.4 cm. x 26 cm. to give a first fraction which was freeze dried to give a solid product. This solid was recrystallized from 300 ml. of benzene using Norite A to give colorless needles of 5-fluoro-2(1H)-pyrimidinone, M.P. 170.5–171.5°.

We claim:
1. A compound of the formula

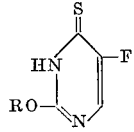

wherein R is lower alkyl.
2. 5-fluoro-2-methoxy-4-thiopyrimidine.
3. 2-ethoxy-5-fluoro-4-thiopyrimidine.
4. A compound of the formula

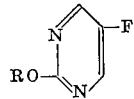

wherein R is lower alkyl.
5. 5-fluoro-2-methoxypyrimidine.
6. 2-ethoxy-5-fluoropyrimidine.

References Cited by the Examiner

Helgeland: Biochimica et Bio Physioa Acta. vol. 87, pages 353–355 (1964).

NICHOLAS S. RIZZO, *Primary Examiner.*